Dec. 18, 1956  D. A. DI TIRRO  2,774,369
VALVE
Filed March 18, 1955  2 Sheets-Sheet 2

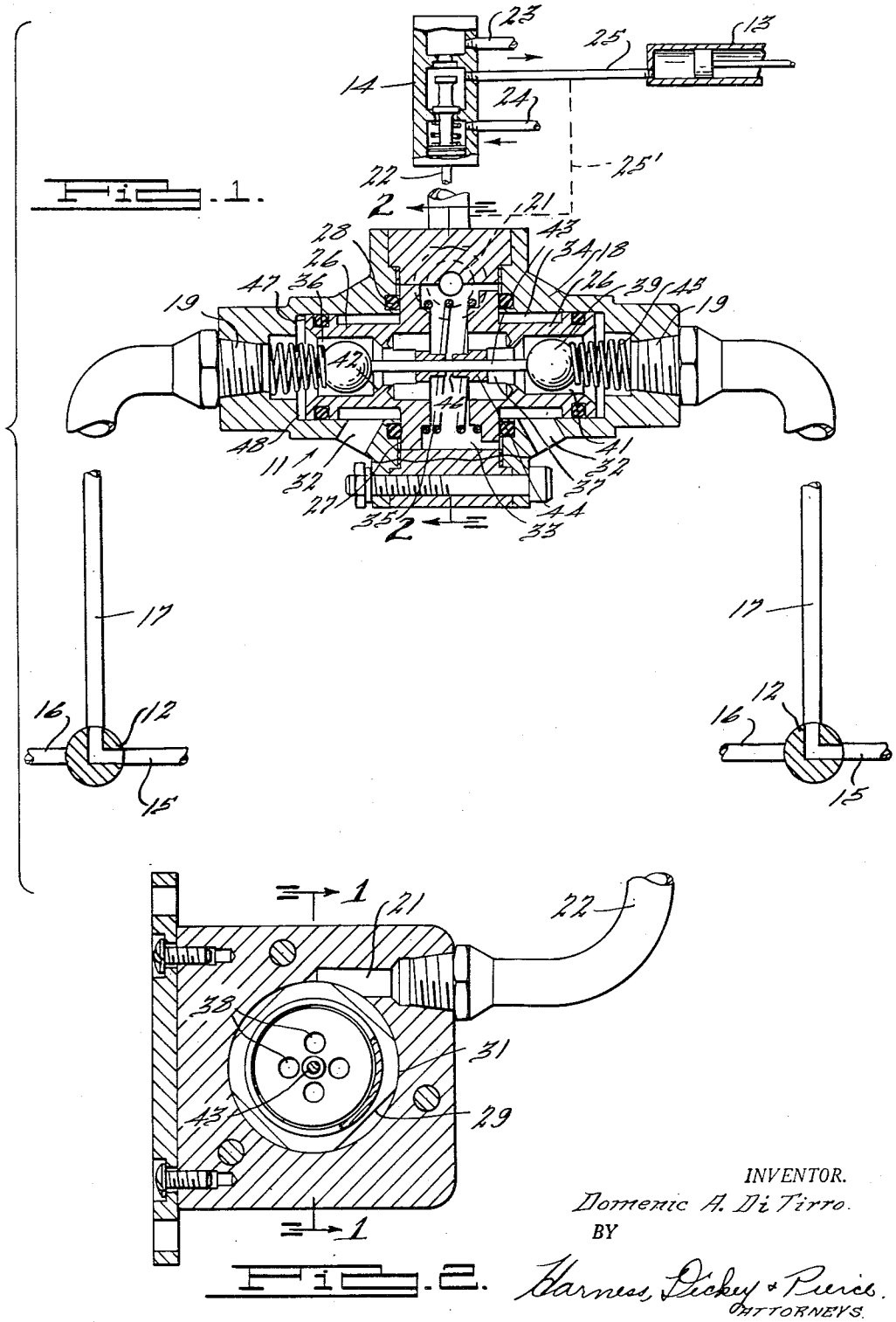

INVENTOR.
Domenic A. DiTirro
BY
Harness, Dickey & Pierce
ATTORNEYS

United States Patent Office 2,774,369
Patented Dec. 18, 1956

2,774,369
VALVE

Domenic A. Di Tirro, Royal Oak, Mich., assignor to Ross Operating Valve Company, Detroit, Mich., a corporation of Michigan Application March 18, 1955, Serial No. 495,229

31 Claims. (Cl. 137—102)

This invention relates to fluid control valves, and more particularly to safety valves in systems for controlling the application of pressure to fluid actuated devices such as presses, clamping fixtures or the like. This application is a continuation-in-part of application Serial No. 344,952, filed March 27, 1953, now abandoned, by the present applicant.

In manual control systems for devices such as pneumatically operated clutches and brakes for presses, it is conventional to provide a pair of hand operated valves which may be simultaneously moved by the operator in order to cycle the device. These valves may be pilot valves which control an appropriate master valve, or they may control the device directly. The provision of two simultaneously operable valves remote from the moving parts of the press and spaced from each other is to insure the safety of the operator, since both hands and arms must be occupied to actuate the machine. It is a frequent practice however for an operator to "tie down" one of the valves in order to relieve himself of the necessity of operating both valves, thereby speeding up the operating cycle of the device. This of course increases the danger of injury to the operator and defeats the purpose of the synchronously operable valves. Attempts have been made in the past to prevent operation of the press or other device when one of the aforementioned valves is tied down by the operator, but such attempts have been either only partially successful or have involved great cost and a complicated arrangement of parts.

It is an object of the present invention to overcome the disadvantages of previous attempted solutions to this problem, and to provide an economical and efficient means for automatically shutting off the supply to a fluid actuated device if for any reason a plurality of control valves are not synchronously moved to their various positions during the cycle.

It is another object to provide an improved safety device of the above nature which will automatically return the system to its normal operating condition when the control valves are again placed in proper position.

It is a further object to provide an improved safety valve of the above nature, which is operated by the same fluid pressure which is used to supply the actuated device, and in which no outside power source or control means is necessary.

It is also an object to provide an improved system for insuring the simultaneous operation of a pair of hand operated control valves, in which the system functions by virtue of pressure differentials between outlets of the two control valves, the delivery pressure to the fluid actuated device being cut off as soon as a predetermined pressure differential exists between the two control valve outlets, the cutoff continuing only until said pressure differential is corrected.

It is another object to provide an improved safety valve to be used in a system of the above nature, in which the proportions may be varied in order to suit different operational conditions and to control the degree of simultaneity required between the control valve movements.

It is also an object to provide a safety valve having the above characteristics which is adapted for use in systems for both single acting and double acting expansible chamber type motors, and which may be used with or without a master valve between the safety valve and the motor.

It is a further object, in one form of the invention, to provide an improved safety valve of the above nature in which means are provided for compensating for variations in supply pressure and also for preventing cut-off of the safety valve caused by minor non-synchronism in actuating the control valves.

Other objects, features, and advantages of the present invention will become apparent from the subsequent description, taken in conjunction with the accompanying drawings.

In the drawings:

Figure 1 is a side elevational view in cross-section of the improved safety valve of this invention, showing the connection of the valve to two hand operated pilot valves and to an expansible chamber type motor, through a master valve, the cross-section of the safety valve being taken along the line 1—1 of Figure 2, parts being shown out of plane for clarity;

Figure 2 is a cross-sectional view taken along the line 2—2 of Figure 1 and showing the porting arrangement of the safety valve;

Figure 3:
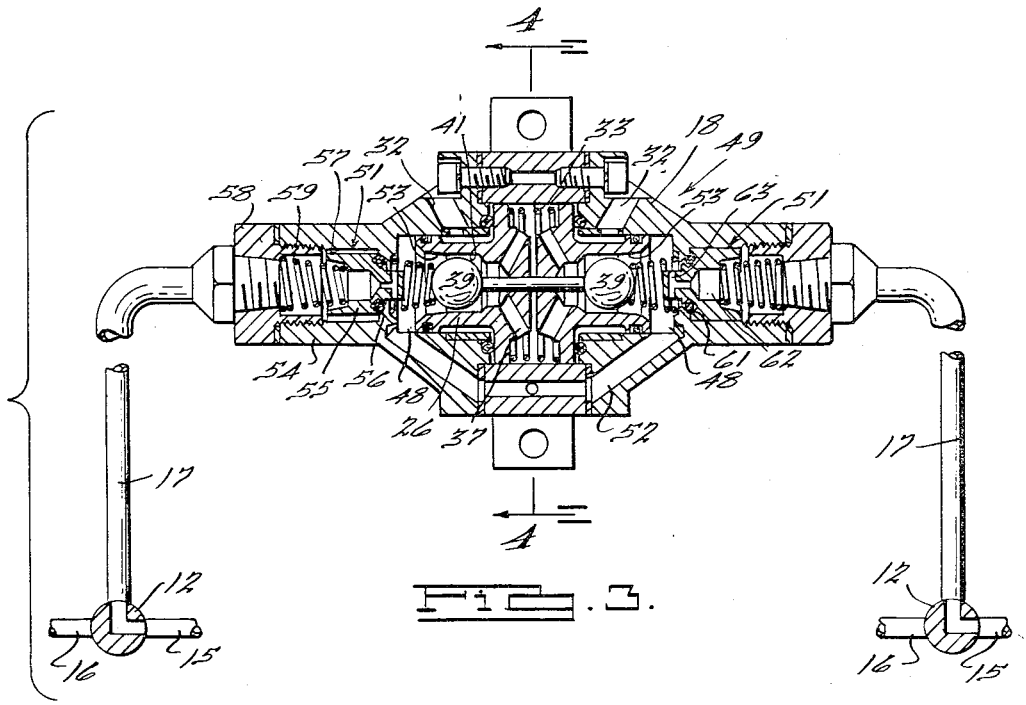
Figure 3 is a side elevational view in cross section of a modified form of the invention incorporating means for compensating for supply pressure fluctuations and for decreasing the sensitivity of the safety valve.

The safety valve of this invention is generally indicated at 11 and is adapted to be connected to a pair of hand operated control valves 12 such as are conventionally used in pneumatic systems for controlling an expansible chamber type motor 13 through a master valve 14. As shown, the control valves 12 are pilot valves of the three-way type, having connections 15 leading from a source of compressed air (not shown) and connections 16 leading to exhaust. The valves are also provided with parallel connections 17 which serve as pilot lines for the master valve 14. It will be understood that although the valves 12 are shown diagrammatically in Figure 1, they may be of any known type and may be located in positions remote from each other and from the device operated by motor 13, so as to insure the safety of the operator. Moreover, while motor 13 is shown as being of the single acting type, other types of fluid actuated devices could be controlled by the system described. In particular, a motor of the double acting type could be used within the scope of the invention, in which case two master valves 14 would be operated by the valves 12, one master valve being normally open and the other normally closed. It will also be observed that in smaller installations where the power requirements are sufficiently small, the valves 12 may serve as direct operating valves, without the intervening master valve 14.

Ordinarily, in order to operate the master valve 14, it is necessary that both pilot valves 12 be synchronously operated. However, it will be seen that it is possible to tie down one of the pilot valves 12 in one position, and operate the master valve 14 merely by actuating the other pilot valve 12. The safety valve 11 serves the function of preventing this possibility.

The safety valve comprises a housing 18 which has pilot inlet connections 19 from each of the pilot valve conduits 17, and the housing further is provided with working port 21 connected to master valve 14 by means of conduit 22. It will therefore be seen that both pilot valves 12 are connected to the master valve 14, through the safety valve 11, and that fluid passing in either direction between the master valve and the pilot valves must pass through the safety valve.

The overall function of the safety valve is to permit, without interference, any desired pressure connections between the pilot valves 12 and the master valve 14 as long as both pilot valves are operated in substantial synchronism. In other words, during normal operation the safety valve 11 serves no function other than to conduct the fluid pressure in either direction between the master valve 14 and the pilot valves 12. As shown, the master valve 14 is of a conventional three-way type having an exhaust connection 23, a supply connection 24 and a connection 25 leading to motor 13. The alternate supply and exhaust of pressure in conduit 22 which operates the master valve will therefore cause alternate supply and exhaust of pressure to motor 13.

The safety valve 11 comes into play through a pressure differential which is created within the valve whenever one of the pilot valves 12 is in a different position than the other. For this purpose, the housing 18 encloses a pair of slidable valve members 26 which are in alignment and at opposite ends of the housing. Each valve 26 has an annular radial sealing surface 27 which engages a corresponding seal 28 supported by the housing, the valve surface being sealed when valves 26 are moved outwardly towards the ends of the housing. As seen in Figure 2, the sealing surfaces 27 have alternate cut-away portions 29 and arcuate bearing portions 31 for the valve sliding movement. When either valve 26 is moved inwardly, that is away from its closed position, the port 21 connected to the master valve 14 is made to connect with vent openings 32 in the valve housing. This connection is by means of central chamber 33 into which port 21 enters, this chamber 33 being connected by means of recessed valve portions 29 with an annular chamber 34 adjacent each vent port 32. When both valves 26 are in their closed positions however, chamber 33 and therefore connection 21 are sealed off from the vent connections 32. A helical spring 35 is provided between the two valves 26, and urges both valves into their closed positions as shown in Figure 1.

Valves 26 are provided with means for carrying the normal pressure flow to and from the master valve 14, and this means includes a central passage 36 in each valve leading from the outer end thereof and narrowing to a passage 37, the latter passages in turn being connected with chamber 33 by means of a plurality of circumferentially spaced passages 38. Normally therefore, with valves 26 in their closed positions, there will at all times be a direct connection between both pilot valves 12 and master valve 14, and the system will operate as though the safety valve 11 were not present as long as pilot valves 12 are operated in synchronism.

The means for sensing the non-synchronism of the pilot valves 12 includes a pair of spherical elements 39 which are disposed within passages 36. The relative dimensions of balls 39 and passages 36 are such that a restricted annular passage 41 remains in each pasasge 36 when the balls are in position. These annular passages are such that in normal operation sufficient air can pass to control master valve 14 from the pilot valves, but at the same time the restrictions create a substantial pressure differential across the ball elements. When fluid is being supplied to the master valve, this pressure differential will tend to urge the balls inwardly so as to seat each ball against a valve seat 42.

A pin 43 is disposed between the balls 39, the pin being slidably supported by bearing portions 44 at the inner ends of valves 26. The length of pin 43 is such that with equal pressures tending to urge balls 39 inwardly, they will both be held from seating against their respective valve seats 42. A pair of helical springs 45 are provided between the housing and balls 39, these springs urging the balls against the ends of pin 43. The dimensions of springs 45 are such that if one of the balls 39 is moved inwardly due to a differential in force between the balls, it can reach its valve seat 42 before the spring 45 at the opposite end is fully closed up. The bearing portions 44 which support the pin 43 are provided with oppositely facing shoulders 46, the purpose of which is described later, and the outer ends of the valves 26 comprise piston faces 47 so that an increase in pressure in either chamber 48 formed by the pistons will force the corresponding valve 26 inwardly, thereby opening port 21 to exhaust.

In operation, as stated previously the safety valve 11 will normally be in the position shown in Figure 1, in which the safety exhaust valves 26 are in their closed position and the sensing valves 39 are in their open position, permitting a direct connection between pilot valves 12 and master valve 14. Let us assume that the operator, desiring to speed up the operation of motor 13, ties down the left hand pilot valve 12 in its supply position, so that supply conduit 15 is connected to pilot outlet conduit 17. Let us further assume that the operator then moves the right hand pilot valves 12 to the exhaust position, connecting its conduit 17 to exhaust passage 16. When this occurs, fluid will be flowing from left to right past left hand ball 39 in Figure 1, but will also be flowing from left to right past the right hand ball 39. The balance of forces on pin 43 will thus be removed, and left hand ball 39 will move against its valve surface 42. The flow of fluid to master valve 14 will thus be interrupted, and pressure will build up in left hand piston chamber 48, forcing left hand exhaust valve 26 to the right. This will separate the sealing surface 27 and the seal 28 of left hand valve 26, and will open chamber 33 to exhaust through left hand exhaust passage 32.

Master valve 14 will therefore be held in its exhaust position, and the subsequent movement of right hand pilot valve 12 will not affect master valve 14, since port 21 will remain vented. To illustrate, assuming right hand pilot valve 12 is moved to the supply position in which supply conduit 16 is connected to pilot outlet conduit 17, the air entering chamber 33 will merely flow out through the open left hand safety exhaust valve, and no pressure will be supplied to master valve 14. It should be noted at this point that the movement of left hand valve 26 to the right is limited by the facing shoulders 46 between the valves, and this movement, while sufficient to open the exhaust valve, is not sufficient to carry sealing surface 42 away from ball 39, which would occur if valve 26 were moved too far.

In order to reset the safety valve and allow normal operation, it is necessary for the operator to move both pilot valves 12 to the exhaust position. When this is done, the left hand chamber 48 will be vented, and spring 35 will urge left hand valve safety exhaust valve 26 into closed position. The forces on pin 43 now being equal, balls 39 will be moved into their central or normal position by springs 45, thus moving left hand ball 39 away from its valve seat 42. The system may then be normally operated to supply fluid pressure to master valve 14, provided that both pilot valves 12 are moved to their supply positions in synchronism.

Assuming a second situation in which the operator ties down the left hand pilot valve 12 in its exhaust position, upon movement of right hand pilot valve 12 to supply position the right hand ball 39 will close against its valve seat 42. The pressure in right hand chamber 48 will thus be increased to open right hand safety exhaust valve 26, and no pressure will be supplied to master valve 14. Here again therefore, no cycling can occur until both pilot valves 12 are again moved to their exhaust position and operated in synchronism.

It is to be noted that when the safety valve operates it always acts to exhaust the conduit 22 leading to the master valve. The construction of the master valve will therefore be preferably such that when conduit 22 is opened to exhaust, the master valve 14 will be moved to its closed position, shutting off the supply of air to motor 13. However, it is to be understood that any other arrangement may be chosen for the stopped position of master valve 14 when safety valve 11 is operated.

Figure 4:
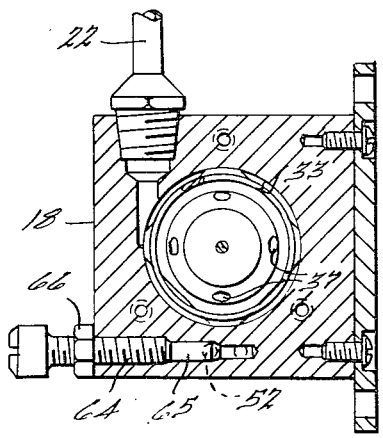
Figure 4 is a cross-sectional view taken along the line 4—4 of Figure 3 and showing the adjustable restriction for the by-pass conduit.

Figures 3 and 4 show a modified form of the invention which has the same principles of operation as Figures 1 and 2 but includes additional means for compensating for supply pressure fluctuations and also for preventing safety valve cut-off caused by minor discrepancies in control movement. In industrial installations it is not uncommon to have a fluid supply pressure which varies from time to time. This variation in supply pressure could cause corresponding variations in the manner of operation of a safety valve of the type illustrated in Figures 1 and 2. In particular, the changes in frictional and in velocity characteristics in the more restricted passageways could cause the sensitivity of the safety valve to fluctuate through a wide range. Moreover, it is ordinarily desirable that the system be kept in operation even though the operator may move one control valve at a slightly different time than the other. Such a discrepancy could easily be created by human error, the operator being devoid of any intent to tie down one of the valves.

Several means for overcoming these difficulties are provided in the safety valve of Figures 3 and 4 generally indicated at 49. A pair of one-way restrictions generally indicated at 51 are disposed between lines 17 and chambers 48, and a by-pass conduit 52 connects left and right hand chambers 48, this conduit having an adjustable restricting device. These features are discussed in detail below.

The major portion of safety valve 49 shown in Figures 3 and 4 is similar to the first embodiment. The valve is connected between a pair of parallel connections 17 which are controlled by pilot valves 12 movable between supply and exhaust positions. A conduit 22 connects central chamber 33 of the safety valve to a fluid-actuated device (not shown). Housing 18 of the safety valve encloses slidable valve members 26 and spherical elements 39 within the central passages of these valve members. Vent openings 32 in the valve housing are connectible with central chamber 33 by inward movement of valve members 26. Central passages 41 in valve members 26 have flared outer portions 53 adjacent chambers 48, passages 37 connecting passages 41 to central chamber 33. By virtue of flared portions 53 of passages 41, the fluid velocity and therefore the pressure drop across a ball 39 will be lessened when it is disposed within the flared portion of the passageway. The purpose of this construction is described in detail below. The remaining elements in the embodiment of Figures 3 and 4 are similar to those found in the first embodiment and cooperate in the same manner to carry out the safety functions of the device. It will be noted that the flared outer portions 53 of passages 41 could be provided in the embodiment of Figures 1 and 2 since the elements associated with these passages are substantially identical in the embodiments.

One-way restrictions 51 are enclosed within extensions 54 of housing 18 and each restriction comprises a slidable member 55 carrying a valve 56 at one end thereof. Each member 55 has flat sides so as to provide passages 57 between the inner surface of extension 54 and member 55. A threaded connection 58 is provided at the outer end of each extension 54, line 17 being attached to this connection. A compression coil spring 59 is disposed within connection 58 and engages the outer end of slidable member 55, urging valve 56 against a valve seat 61. A central passageway 62 is provided in member 55, this passageway leading from connection 58 to a T-shaped passageway 63.

When members 55 are in the position shown in Figure 3, valves 56 are closed and passageways 63 are connected with chambers 48. With this position, it will be seen that if either pilot valve 12 is turned to its supply position, fluid will flow through connection 58, passageway 62 and passageway 63 of the corresponding sildable member 55. The restriction imposed by passageway 63 will cause the pressure build-up in corresponding chamber 48 to be slightly delayed, the time of this delay depending on the size of passageway 63. Due to the T-shaped nature of passageways 63 the fluid flowing from passageways 62 will not impinge directly on balls 39 and will therefore not interfere with their operation. When either pilot valve 12 is turned to exhaust, the fluid pressure in corresponding chamber 48 will force member 55 outwardly, compressing spring 59 and opening valve 56. Fluid will then flow through valve 56, passages 57 and connections 58 to lines 17. The area available for this flow from safety valve 49 to pilot valves 12 is substantially greater than the restricted flow area available from pilot valves 12 to the safety valve. It will be noted that each slidable member 55 can move independently of the other slidable member, so that the position of each will be governed by the position of its corresponding pilot valve 12 and the pressure in its corresponding chamber 48.

By-pass conduit 52 comprises a passageway which connects left and right hand chambers 48, by-passing ball valves 39 and central chamber 33. The diameter of this passageway may be of any appropriate size, but is preferably small enough to insure appreciable frictional losses in fluid flow passing from one chamber to the other. A restricting device comprising a screw 64 is mounted in housing 18, this screw having an end portion 65 capable of restricting a predetermined area of passageway 52. A lock nut 66 may be provided for holding screw 64 in position. By means of this passageway, it will be seen that the buildup of pressure in either chamber 48 will take place more slowly than if the passageway were not present.

In operation, the safety valve of Figures 3 and 4 will operate basically in the same manner as that of Figures 1 and 2, and this operation need not be repeated in detail. However, in order to bring out the functions of the modified features, it will be assumed that left hand control valve 12 is turned to its supply position and that a few moments later right hand control valve 12 is turned to supply. Upon connection of left hand valve 12 to supply, fluid will be forced through connection 58, passageway 62 and passageway 63 of left hand slidable member 55. The restriction imposed by passageway 63 will cause a slight delay in the pressure buildup in chamber 48 and thus in the velocity of fluid past left hand ball 39. The presence of by-pass 52 will likewise lengthen the time interval needed to build up the pressure in chamber 48 and the velocity past ball 39 necessary to shift the left hand ball to its closed position. Depending on the setting of restriction 65 and the other relative dimensions of the parts, right hand pilot valve 12 could be turned to supply a predetermined time after the left hand pilot valve without shifting safety valve 49 to its cut-off position. Without the presence of one-way restriction 51 and by-pass 52 this control of sensitivity would not be available.

In another instance, assume that the supply pressure available at supply lines 15, is, say, 50 p. s. i. on one occasion and is 100 p. s. i. at a later time. In the absence of one-way restrictions 51 and by-pass 52, such a fluctuation in supply pressure would cause a corresponding variation in the degree of sensitivity of the safety valve. The damping effect of these elements, however, will greatly reduce the variation in sensitivity resulting from pressure variations, thus resulting in a more reliable and effective device.

When fluid passes from safety valve 49 to either pilot valve 12, the corresponding slidable member 55 will shift to its open position, providing a relatively unrestricted flow from chamber 48. The desirability of freer flow in a direction from safety valve 49 to pilot valves 12 stems from the characteristics of fluid flow, especially those of compressible fluids. The fluid actuated device with which the present system is used may be considered roughly as a constant volume source. If one of the pilot valves 12 is connected to exhaust and the other is connected to supply, the fluid flowing from the second valve to the first could be considered as coming from a constant pressure source. When the safety valve is to be moved from its normal position to its cutoff position, it is desired that this action takes place as quickly as possible. In order to achieve the maximum pressure differential across the parts for movement of the safety valve to cutoff position, the flow should be relatively rapid. With the sources of fluid described above, this is achieved by providing a relatively unrestricted flow from chamber 48 to the pilot valve 12 which is connected to exhaust.

Tests have proved that the presence of restrictions 51 in the system will not interfere with its operation in terms of offering excessive resistance to flow. One reason for this is that the unitized nature of the safety valve makes possible a minimum of outside piping in the system, and the friction losses thus eliminated make it feasible to use controlled restrictions of the type described.

Should one of exhaust safety valves 26 be in its open-position, ball 39 of the opposite safety exhaust valve 26 will be disposed in flared portion 53 of its passageway 41. This will provide a greater area for the passage of fluid past the ball valve 39 which is in open position. It will be noted that the function of flared passageway portion 53 is not restricted to use with an embodiment such as that of Figures 3 and 4, but is also applicable to the embodiment of Figures 1 and 2. One advantage of providing a greater flow area past open ball valve 39 is to minimize the effect of a sudden inrush of fluid which could cause closed ball valve 39 to be lifted from its seat. Assume for example that left hand pilot valve 12 is tied down in its supply position and right hand pilot valve 12 is moved to its exhaust position, thus closing left hand ball valve 39 and opening left hand safety exhaust valve 26 as described above. If right hand pilot valve 12 is quickly turned to its supply position, fluid will rush past right hand ball valve 39 which is disposed in flared portion 53 of its passageway 41, and thence into central chamber 33. If the annular area of fluid flow around right hand ball valve 39 were not sufficient, the velocity and therefore the pressure drop across this ball valve might be great enough to force left hand ball valve 39 off its seat by the force transmitted through pin 43. This would reduce the pressure in left hand chamber 48 and might cause losing of left hand exhaust valve 26. By providing flared passageway portion 53, the pressure differentiaal across right hand ball valve 39 is reduced and opening of left hand ball valve 39 is prevented.

It will be apparent that the invention is subject to further modification without departing from the proper scope of the subjoined claims. In particular, modifications could be provided which include one-way restrictions 51 without by-pass 52, or which provide the by-pass without including the one-way restriction feature.

What is claimed is:

1. In a system for controlling a fluid actuated device, a plurality of independently operable control valves, parallel connections between said valves and said device, the valves being movable to supply and exhaust positions, and safety means separate from said fluid actuated device, said safety means being interposed between said parallel connections and said device and having a normal position permitting uninterrupted fluid flow between said valves and said device in either direction, said means being responsive to discrepant positions between said valves to disenable said connections, said means being further operative to reenable said connections when said valves are moved in unison.

2. In a system for controlling a fluid actuated device, a pair of independently operable valves for simultaneously controlling the supply and exhaust to said device, safety means separate from said fluid actuated device, said safety means being interposed between said valves and said device and having a normal position permitting uninterrupted fluid flow between said valves and said device in either direction, said safety means including means responsive to lack of synchronism between said valves to render said valves inoperative for controlling said device, and means in said safety means for restoring the operability of said valves when they are operated in synchronism.

3. In a system for controlling a fluid actuated device, a pair of independently operable manual control valves for controlling the supply and exhaust to said device, parallel connections between said independently operable valves and said device, and safety means separate from said fluid actuated device, said safety means being interposed between said parallel connections and said device and having a normal position permitting uninterrupted fluid flow between said valves and said device in either direction, said safety means being responsive to a pressure differential caused by the non-uniform position of said valves to disenable said connections.

4. The combination according to claim 3, said safety means being further provided with means for reenabling said connections when said valves are moved in unison.

5. In a system for controlling a fluid actuated device including a pair of separately operable control valves for supplying and exhausting said device, the combination with said system of safety means separate from said fluid actuated device, said safety means being disposed between said valves and said device, means holding said safety means in a normal position permitting uninterrupted fluid flow between said valves and said device in either direction, and means responsive to discrepant positions between said valves to move said safety means to a second position in which the connections between said valves and said device are vented.

6. The combination according to claim 5, said safety means including a valve body having fluid connections to each of said first-mentioned valves, a fluid connection to said device, and a vent connection, means in said valve body for controlling the position of said safety means, said control means including a pair of sensing elements each responsive to the direction of fluid flow in one of said control valves, and means interconnecting said sensing elements and movable in response to a force differential between them to cause said safety means to be placed in its second position.

7. The combination according to claim 5, said safety means including a valve body having fluid connections to each of said control valves, a fluid connection to said device, and a vent connection, a normally closed valve between said vent connection and said other connections, and means responsive to fluid pressure from one of said control valves to open said vent valve.

8. The combination according to claim 7, said vent valve moving means including a piston type valve actuating member in said safety means valve body, the connection from said one control valve leading to the chamber formed by said piston, a normally open passage connecting said chamber with said device connection, and means responsive to discrepant positions between said control valves for closing said passage.

9. In a system for controlling a fluid actuated device including a pair of independently operable three-way control valves each having a supply and exhaust position, parallel connections between said valves and said device, safety means separate from said fluid actuated device, said safety means being interposed in said parallel connections and movable between a normal position maintaining said connections so as to allow flow therethrough in either direction and a safety position venting said connections, said safety means including means responsive to discrepant positions of said control valves to move said safety means to its safety position, and means actuatable when both of said control valves are in their exhaust position for returning said safety means to its normal position.

10. In a system for controlling a fluid actuated device including a master valve for controlling the supply and exhaust to said device, a pair of separately operable pilot valves for controlling the movement of said master valve, and parallel connections between said pilot valves and said master valve, the combination with said system of safety means separate from said master valve, said safety means being interposed between said parallel connections and said master valve, said safety means being movable between a normal position in which uninterrupted flow is maintained in both directions between said pilot valves and said master valve, and a safety position in which said connections are vented, and pressure differential responsive means in said safety means responsive to pressure differentials caused by discrepant positions of said pilot valves to move said safety means from its normal position to its safety position.

11. In a system for controlling a fluid actuated device including a pair of control valves independently movable between a supply position and an exhaust position, and parallel connections between said control valves and said device, the combination with said system of safety means separate from said fluid actuated device connected to said parallel connections, said safety means being movable between a normal position allowing uninterrupted flow to and from said control valves and a safety position venting said parallel connections, said safety means including means responsive to pressure from one of said control valves when in its supply position to move said safety means to its safety position when the other control valve is in its exhaust position, means in said safety means for venting the fluid pressure from said second control valve when moved to its supply position while said first control valve remains in its supply position, and means in said safety means responsive to the movement of both control valves to their exhaust position for restoring said safety means to its normal position.

12. In a system for controlling a fluid actuated device including a pair of control valves separately movable between supply and exhaust positions and having parallel connections to said device, safety means interposed between said parallel connections, said safety means including a housing, a chamber in said housing, passages from each of said parallel connections to said chamber, said passages being normally open, means for connecting said chamber to said fluid actuated device, a pair of vent passages in said housing, a pair of piston operated normally closed valves between said chamber and said vent passages, a pair of movable sensing elements in said first-mentioned passages, said element being sensitive to fluid flow within the said passages, and means interconnecting said sensing elements whereby said elements are normally stationary when subjected to symmetrical forces, a differential of forces between said sensing elements causing one of said elements to move so as to close its corresponding passage, the increase in pressure due to the closure of said passage causing one of said piston operated vent valves to move into its open position.

13. The combination according to claim 12, further provided with a pair of resilient members urging said elements toward their closed positions.

14. In a device of the class described, a housing having a pair of ports for connection to separate sources of intermittent fluid pressure, a chamber in said housing, a port leading from said chamber for connection to a device to be actuated by said intermittent pressure sources, a pair of vent passages in said housing, a pair of oppositely disposed piston operated vent valves between said chamber and said vent passages, resilient means normally holding said valves in closed position, passages in said valves leading from the chambers formed by the valve pistons to said first-mentioned chamber, said valve piston chambers being connected to said first-mentioned ports, a pair of elements disposed within said last-mentioned passages, said elements each being movable between a normally open position permitting fluid flow in either direction in said passage and a position closing said passage, the passage of fluid from said valve piston chambers toward said first-mentioned chamber urging said elements toward their closed positions, and means interconnecting said elements so as to hold the elements simultaneously in their open positions when the forces on said elements are substantially equal, a differential in said forces causing one of said elements to move into its closed position, whereby continued fluid pressure from its corresponding first-mentioned port will cause the corresponding vent valve to move into its open position.

15. The combination according to claim 14, further provided with stop means for limiting the opening movement of said vent valve, whereby said movement will not affect the closed position of said element.

16. The combination according to claim 14, said movable elements comprising ball members disposed within said passages, the relative dimensions of said ball members and passages being such that the fluid flow around said ball members is restricted, whereby a substantial pressure differential is created across said ball members.

17. The combination according to claim 14, said interconnecting means between the movable elements comprising a pin slidably supported by said vent valves, and resilient means urging said movable elements into engagement with said pin.

18. In a system for controlling a fluid actuated device, a plurality of independently operable control valves, parallel connections between said valves and said device, the valves being movable to supply and exhaust positions, safety means separate from said fluid actuated device, said safety means being interposed between said parallel connections and said device and having a normal position permitting uninterrupted fluid flow between said valves and said device in either direction, said means being responsive to discrepant positions between said valves to disenable said connections, said means being further operative to reenable said connections when said valves are moved in unison, and one-way restrictions between said parallel connections and said safety means, said restrictions being operative to restrict fluid flow from said valves to said safety means and providing relatively unrestricted fluid flow from said safety means to said valves.

19. In a system for controlling a fluid actuated device, a pair of independently operable manual control valves for controlling the supply and exhaust to said device, parallel connections between said independently operable valves and said device, safety means separate from said fluid actuated device, said safety means being interposed between said parallel connections and said device and having a normal position permitting uninterrupted fluid flow between said valves and said device in either direction, said safety means being responsive to a pressure differential caused by the non-uniform position of said valves to disenable said connections, and a pair of one-way restrictions between said parallel connections and said safety means, said restrictions providing restricted flow of fluid toward said safety means and relatively unrestricted flow toward said control valves.

20. In a system for controlling a fluid actuated device including a pair of separately operable control valves for supplying and exhausting said device, the combination with said system of safety means separate from said fluid actuated device, said safety means being disposed between said valves and said device, means holding said safety means in a normal position permitting uninterrupted fluid flow between said valves and said device in either direction, means responsive to discrepant positions between said valves to move said safety means to a second position in which the connections between said valves and said device are vented, and the pair of one-way restrictions between said parallel connections and said safety means, said restrictions providing restricted flow of fluid toward said safety means and relatively unrestricted flow toward said control valves.

21. The combination according to claim 20, said safety means including a valve body having fluid connections to each of said control valves, a fluid connection to said device, and a vent connection, said one-way restrictions being disposed in said control valve fluid connections, means in said valve body for controlling the position of said safety means, said control means including a pair of sensing elements each responsive to the direction of fluid flow in one of said control valves, and means interconnecting said sensing elements and movable in response to a force differential between them to cause said safety means to be placed in its second position.

22. The combination according to claim 21, further provided with a restricted by-pass conduit between the fluid connections to said control valves.

23. In a system for controlling a fluid actuated device including a pair of independently operable three-way control valves each having a supply and exhaust position, parallel connections between said valves and said device, safety means separate from said fluid actuated device, said safety means being interposed in said parallel connections and movable between a normal position maintaining said connections so as to allow flow therethrough in either direction and a safety position venting said connections, said safety means including means responsive to discrepant positions of said control valves to move said safety means to its safety position, means actuatable when both of said control valves are in their exhaust position for returning said safety means to its normal position, and a pair of one-way restrictions between said parallel connections and said safety means, said restrictions providing restricted flow of fluid toward said valve safety means and relatively unrestricted flow toward said control valves.

24. In a system for controlling a fluid actuated device including a pair of control valves separately movable between supply and exhaust positions and having parallel connections to said device, safety means interposed between said parallel connections, said safety means including a housing, a chamber in said housing, passages from each of said parallel connections to said chamber, said passages being normally open, means for connecting said chamber to said fluid actuated device, a pair of vent passages in said housing, a pair of normally closed valves between said chamber and said vent passages, pistons for operating said valves, the chambers formed by said pistons forming portions of said passages, a by-pass interconnecting the chambers formed by said pistons, a pair of movable sensing elements in said first-mentioned passages, said elements being sensitive to fluid flow within the said passages, means interconnecting said sensing elements whereby said elements are normally stationary when subjected to symmetrical forces, a differential of forces between said sensing elements causing one of said elements to move so as to close its corresponding passage, the increase in pressure due to the closure of said passage causing one of said piston operated vent valves to move into its open position, and means for adjustably restricting the area of said by-pass, whereby the time delay between the start of said force differential and the opening of said one vent valve may be predetermined.

25. The combination according to claim 24, further provided with a pair of one-way restrictions between said parallel connections in said first-mentioned passages, said restrictions providing a relatively restricted area of flow in the direction of said safety means and a relatively unrestricted flow area toward said control valves.

26. The combination according to claim 25, further provided with means in said one-way restrictions for preventing impingement of fluid on said sensing elements when flowing in the direction of said safety means.

27. In a device of the class described, a housing having a pair of ports for connection to separate sources of intermittent fluid pressure, a central chamber in said housing, a port leading from said central chamber for connection to a device to be actuated by said intermittent pressure sources, a pair of vent passages in said housing, a pair of oppositely disposed piston operated vent valves between said central chamber and said vent passages, resilient means normally holding said valves in closed position, passages in said valves leading from the chambers formed by the valve pistons to said central chamber, said valve piston chambers being connected to said first-mentioned pair of ports, a passageway directly interconnecting said valve piston chambers, an adjustable restriction in said interconnecting passageway, a pair of elements disposed within said valve passages, said elements each being movable between a normally open position permitting fluid flow in either direction in its passage and a position closing its passage, the flow of fluid from said valve piston chambers toward said central chamber urging said elements toward their closed positions, and means interconnecting said elements so as to hold the elements simultaneously in their open positions when the forces on said elements are substantially equal and opposite, a differential in said forces causing one of said elements to move into its closed position, whereby continued fluid pressure from its corresponding first-mentioned port will cause the corresponding vent valve to move into its open position.

28. In a device of the class described, a housing having a pair of ports for connection to separate sources of intermittent fluid pressure, a central chamber in said housing, a port leading from said central chamber for connection to a device to be actuated by said intermittent pressure sources, a pair of vent passages in said housing, a pair of oppositely disposed piston operated vent valves between said central chamber and said vent passages, resilient means normally holding said valves in closed position, passages in said valves leading from the chambers formed by the valve pistons to said central chamber, one-way restrictions between said valve piston chambers and said first-mentioned pair of ports, said restrictions allowing relatively restricted flow toward said valve piston chambers and relatively unrestricted flow toward said ports, a passageway directly interconnecting said valve piston chambers,, an adjustable resriction in said interconnecting passageway, a pair of elements disposed within said valve pasages, said elements each being movable between a normally open position permitting fluid flow in either direction in its passage and a position closing its passage, the flow of fluid from said valve piston chambers toward said central chamber urging said elements toward their closed positions, and means interconnecting said elements so as to hold the elements simultaneously in their open positions when the forces on said elements are substantially equal and opposite, a differential in said forces causing one of said elements to move into its closed position, whereby continued fluid pressure from its corresponding first-mentioned port will cause the corresponding vent valve to move into its open position.

29. In a system for controlling a fluid actuated device including a pair of control valves separately movable between supply and exhaust positions and having parallel connections to said device, safety means interposed between said parallel connections, said safety means including a housing, a chamber in said housing, passages from each of said parallel conenctions to said chamber, said passages being normally open, means for connecting said chamber to said fluid actuated device, a pair of vent passages in said housing, a pair of normally closed piston operated valves between said chamber and said vent passages, a pair of movable sensing elements in said first-mentioned passages, said elements each being movable from an intermediate normal position in one direction to a closed position and in the opposite direction to an unrestricted-flow position, said elements when in their normal position permitting relatively restricted flow in either direction in said passages and being sensisitve to fluid flow within said passages, each element when in its closed position preventing fluid flow toward said chamber, each element when in its unrestricted-flow position permitting relatively unrestricted fluid flow, means interconnecting said sensing elements whereby said elements are held stationary in their normal position when subjected to symmetrical forces, a differential of forces between said sensing elements causing one of said elements to move to its closed position, said interconnecting means being responsive to movement of said one element to its closed position to move said other element to its unrestricted-flow position, and means responsive to the increase in pressure due to movement of said one element to its closed position for causing one of said piston operated vent valves to move to its open position.

30. In a device of the class described, a housing having a pair of ports for connection to separate sources of intermittent fluid pressure, a central chamber in said housing, a port leading from said chamber for connection to a device to be actuated by said intermittent pressure sources, a pair of vent passages in said housing, a pair of oppositely disposed piston operated vent valves between said chamber and said vent passages, the chambers formed by said valve pistons being connected to said first-mentioned ports, resilient means normally holding said valves in closed position, passages in said valves leading from said valve piston chambers to said central chamber, said last-mentioned passages having widened portions adjacent said valve piston chambers, a pair of elements disposed within said last-mentioned passages, said elements each being movable from an intermedate normal position in one direction to a closed position and in the opposite direction to an unrestricted-flow position, said elements when in their normal position permitting relatively restricted fluid flow in either direction in said passages and being sensitive to said fluid flow, each element when in its closed position preventing fluid flow toward said first-mentioned chamber, each element when in its unrestricted-flow position being in the widened portion of its corresponding passage and permitting relatively unrestricted fluid flow, and means interconnecting said elements so as to hold the elements simultaneously in their normal positions when the forces on said elements are substantially equal and opposite, a differential in said forces causing one of said elements to move into its closed position, said interconnecting means being responsive to movement of one element to its closed position to move the other element to its unrestricted-flow position.

31. In a device of the class described, a housing having a pair of ports for connection to separate sources of intermittent fluid pressure, a chamber in said housing, a port leading from said chamber for connection to a device to be actuated by said intermitent pressure sources, a pair of vent passages in said housing, a pair of oppositely disposed piston operated vent valves between said chamber and said vent passages, resilient means normally holding said valves in closed positions, passages in said valves leading from the chambers formed by the valve pistons to said first-mentioned chamber, said valve piston chambers being connected to said first-mentioned ports, a pair of elements disposed within said last-mentioned passages, said elements each being movable between a normally open position permiting fluid flow in either direction in said passage and a position closing said passage, the passage of fluid from said valve piston chambers toward said first-mentioned chamber urging said elements toward their closed positions, and a rigid member mounted for free sliding movement and engageable at its opposite ends by said elements, said member being responsive solely to the forces exerted on it by said elements when urged against said member and being of such length that the elements are simultaneously held in their open positions when the forces on said elements are substantially equal, a differential in the forces on said elements causing one of said elements to move into its closed position, whereby continued fluid pressure from its corresponding first-mentioned port will cause the corresponding vent valve to move into its open position.

References Cited in the file of this patent

UNITED STATES PATENTS

| | | |
|---|---|---|
| 683,273 | Grey | Sept. 24, 1901 |
| 868,680 | Martin | Oct. 22, 1907 |
| 1,609,273 | Davis | Nov. 30, 1926 |
| 1,838,536 | Davis | Dec. 29, 1931 |
| 2,013,102 | Ledbetter | Sept. 3, 1935 |
| 2,145,294 | Daly | Jan. 31, 1939 |
| 2,449,392 | Kremiller | Sept. 14, 1948 |
| 2,460,774 | Trautman | Feb. 1, 1949 |
| 2,483,312 | Clay | Sept. 27, 1949 |
| 2,628,629 | Deardorff | Feb. 17, 1953 |

FOREIGN PATENTS

| | | |
|---|---|---|
| 618,629 | Germany | Sept. 3, 1935 |